United States Patent [19]
Agrawal et al.

[11] Patent Number: 5,958,038
[45] Date of Patent: Sep. 28, 1999

[54] COMPUTER PROCESSOR WITH TWO ADDRESSABLE MEMORIES AND TWO STREAM REGISTERS AND METHOD OF DATA STREAMING OF ALU OPERATION

[75] Inventors: Nitin Agrawal; Sunil Nanda, both of Bangalore, India

[73] Assignee: S3 Incorporated, Santa Clara, Calif.

[21] Appl. No.: 08/966,904

[22] Filed: Nov. 7, 1997

[51] Int. Cl.[6] .................................................. G06F 15/00
[52] U.S. Cl. ................................. 712/36; 712/1; 712/35; 712/36; 712/208; 712/220; 712/221; 712/223; 711/100; 711/116; 711/220
[58] Field of Search ........................ 395/800.01–800.41, 395/376–390; 712/1–41, 200–214; 711/100, 116, 220

[56] References Cited

U.S. PATENT DOCUMENTS

| | | | |
|---|---|---|---|
| 4,241,397 | 12/1980 | Strecker et al. | 711/220 |
| 5,450,555 | 9/1995 | Brown, III et al. | 395/569 |
| 5,455,955 | 10/1995 | Kida et al. | 395/384 |
| 5,638,534 | 6/1997 | Kiuchi et al. | 395/562 |
| 5,692,207 | 11/1997 | Ho-Lung et al. | 395/800.36 |
| 5,805,913 | 9/1998 | Guttag et al. | 395/800.23 |

*Primary Examiner*—Meng-Ai T. An
*Assistant Examiner*—Nabil El-Hady
*Attorney, Agent, or Firm*—Fenwick & West LLP

[57] ABSTRACT

A processor having a modified Harvard architecture having first and second memories, an address register file divided into first and second sets of registers, first and second stream registers, and a general purpose register file for performing data streaming. The first and second sets of registers respectively address the first and second memories which, in turn, load data into the first and second stream registers. An arithmetic logic unit (ALU) accepts the stream registers and general purpose registers as inputs. Stream instructions are encoded such that a single instruction specifies an ALU operation performed on selected ALU inputs and where to store the results of the ALU operation, loads new values into the stream registers, and updates the address registers. A stream instruction has three operand fields respectively specifying two operands for the next ALU operation and a location to store the result of the current ALU operation. The bits in the fields for specifying a stream register and addressing mode are positionally overlapped with the bits for specifying a particular general purpose register. This encoding allows a simple instruction decoding mechanism while enabling parallel memory accesses and address update in a compact instruction.

18 Claims, 4 Drawing Sheets

COMPUTER PROCESSOR WITH TWO ADDRESSABLE MEMORIES AND TWO STREAM REGISTERS AND METHOD OF DATA STREAMING OF ALU OPERATION

BACKGROUND OF THE INVENTION

1. Field of the Invention

This invention pertains in general to microprocessors and in particular to a processor for performing media operations. More particularly, this invention pertains to a processor having a modified Harvard memory architecture and performing streaming ALU operations.

2. Description of Background Art

There is a general desire to increase the speed of computer processors. This desire is especially acute in the field of media processing, including digital signal processing (DSP), graphics processing, audio processing, and video processing. In this field, a typical algorithm will process a large number of elements while using each element only once. For example, a typical DSP filter loop will process a large number of different input samples and apply a different operand from a large coefficient array to each input sample. Thus, a typical cycle of operation in such a processing environment requires 1) determining the addresses of the sample and coefficient; 2) retrieving the sample and coefficient from memory; 3) operating on the sample and coefficient; and 4) storing the result of the operation.

To meet the demands of media processing, various techniques have been employed to either increase the clock speed of the processor or improve the efficiency of instruction processing by the processor. One such technique is the reduced instruction set computer (RISC) architecture. A RISC architecture uses a low-complexity design adapted to handle a small set of simple instructions in order to obtain high-speed and high-performance. In addition, a RISC architecture uses fixed length instructions with very few instruction formats and fixed positions for certain operand fields, like register indices, within the instruction format. This architecture allows for low-complexity instruction decoders and control logic and this lower complexity can be leveraged into increased performance from other parts of the processor.

Another way to reduce complexity in a RISC-based processor is to decouple arithmetic logic unit (ALU) functions from the operand movement between the register file and memory. This decoupling results in a load-store architecture wherein memory accesses are allowed only by explicit loads and stores. Subsequently, this load-store architecture results in an expansion of code size because an instruction must explicitly call for each memory access. In order to perform the DSP steps discussed above, therefore, the RISC processor must issue two loads and a store for a single iteration of a DSP filter loop.

Unlike RISC processors, many complex instruction set computer (CISC) processors have instructions allowing simultaneous memory accesses from two different memory locations. Using these instructions, a programmer can retrieve both an input sample and a coefficient in a single instruction cycle. In addition, such processors allow simultaneous ALU operation. Thus, the number of instructions necessary to perform a DSP filter loop is reduced.

To achieve this functional parallelism, however, CISC processors generally have complex instruction decoding schemes in which several operands are implicit for the instruction and the load/store mechanism is coupled to the ALU operation encoding. Accordingly, few operations allow parallel load-stores. Even those operations, moreover, are limited to combinations to and from a small register file and support only a limited subset of parallel ALU operations. In addition, such processors require complex instruction decoders and, therefore, have lower clock speeds.

Another technique for increasing processor efficiency is superscalar instruction scheduling. Processors supporting superscalar instruction scheduling dynamically extract instruction-level parallelism from the instruction stream and then group loads and stores with ALU operations. In this manner, the instructions can utilize parallel functional units in the processor. However, such processors are highly complex in terms of design and size.

Yet another approach used to increase processing efficiency is the very long instruction word (VLIW) format. The VLIW format explicitly encodes instruction-level parallelism into a very long instruction word. The VLIW typically has fields for frequently performed operations, such as ALU operations and memory accesses. By using VLIW, the instructions required for a DSP filter loop can be incorporated into a single instruction word. Moreover, the VLIW format allows use of a low-complexity decoder and has the potential for high performance by parallelizing the use of multiple functional units within the processor.

The VLIW format, however, essentially demands that parallelism in the instruction stream be determined when the program is compiled. This demand results in an extremely complex programming model and, accordingly, a difficult program compilation. Thus, the gains made in processing efficiency by using the VLIW format are offset by the compile-time difficulties.

SUMMARY OF THE INVENTION

The problems described above are eliminated by a novel processor and method for data streaming constructed according to the present invention. The processor preferably has a modified Harvard memory architecture with first and second addressable memories, an address register file having first and second groups of address register sets, first and second address generation units respectively coupled to the first and second groups of address register sets, first and second stream registers, a general purpose register (GPR) file, and an arithmetic logic unit (ALU).

The address register file preferably includes eight register sets divided into two groups of four register sets each. Each register set contains a base register, a step register, and a modulo register. The first and second groups of address register sets respectively address the first and second addressable memories. When a memory access is made to an address register set, contents in that address register set are sent to the respective addressable memory as the address. The first and second address generation units respectively update the contents of selected address register sets in the first and second groups according to one of six addressing modes.

The first and second addressable memories output data in response to receiving an address from an address register set. These data are respectively stored in the first and second stream registers. The GPR register file contains 32 GPRs. The ALU accepts two operands as inputs, the first of which is either the first stream register or a GPR and the second of which is either the second stream register or a GPR. The ALU output may be stored in the first or second addressable memory or a GPR.

The processor executes stream instructions. A stream instruction performs three actions in parallel: 1) it performs a specified ALU operation on the operands in the stream registers or the GPRs and stores the result in a GPR or memory; 2) it updates the stream registers by using addresses from the address register file to load new values; and 3) it updates the addresses in the address register file.

To perform these three actions, a stream instruction encodes an operand selection field and three operand fields. The operand selection field selects the operands for the ALU operation and specifies whether to store the result in the first or second addressable memories or a GPR. The first and second operand fields specify operands for use by an ALU operation performed by a subsequent stream instruction. The first operand can specify either a register set in the first group in the address register file and an addressing mode or a GPR. Likewise, the second operand can specify either a register set in the second group and an addressing mode or a GPR. Five bits are needed to choose either a register set and addressing mode or a particular GPR. Accordingly, the bits for addressing a GPR are positionally the same as the bits for selecting a register set and an addressing mode.

BRIEF DESCRIPTION OF THE DRAWINGS

FIG. 4 is a chart illustrating an instruction word format used by the processor of FIG. 2.

DETAILED DESCRIPTION OF THE PREFERRED EMBODIMENTS

Figure 1:
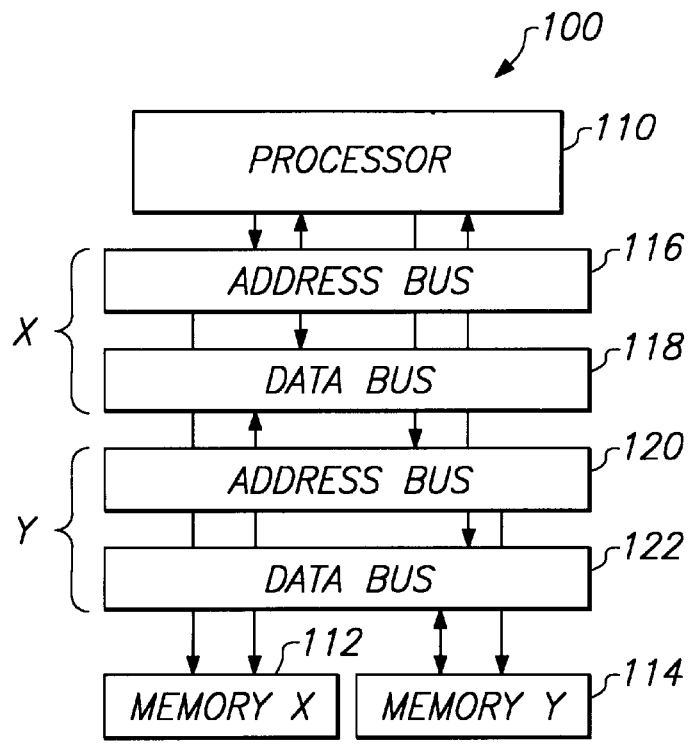
FIG. 1 is a high-level block diagram illustrating a prior art Harvard memory architecture.

FIG. 1 illustrates a high-level block diagram of a prior art Harvard Memory Architecture 100. In the Harvard architecture, the processor core logic 110 is coupled to two independent memory banks 112,114 via two independent sets of buses X,Y. The processor core 110 is coupled to an X memory 112 via an X bus having an address bus 116 and a data bus 118. In addition, the processor core 110 is coupled to a Y memory 114 via a Y bus having an address bus 120 and a data bus 122. Traditionally, a Harvard architecture holds data in one memory bank and instructions in the other. Accordingly, an architecture where data are held in two memory banks and instructions are held in a third is called a "modified Harvard architecture."

An advantage of the modified Harvard architecture is that two memory accesses can be performed in a single instruction cycle. This advantage is realized when the processor having the architecture performs media operations. In such operations, the processor typically operates on two arrays of data, one array of coefficients and one array of samples. If each array is stored in a different memory, then the processor can access both arrays of data in a single instruction cycle.

Figure 2:
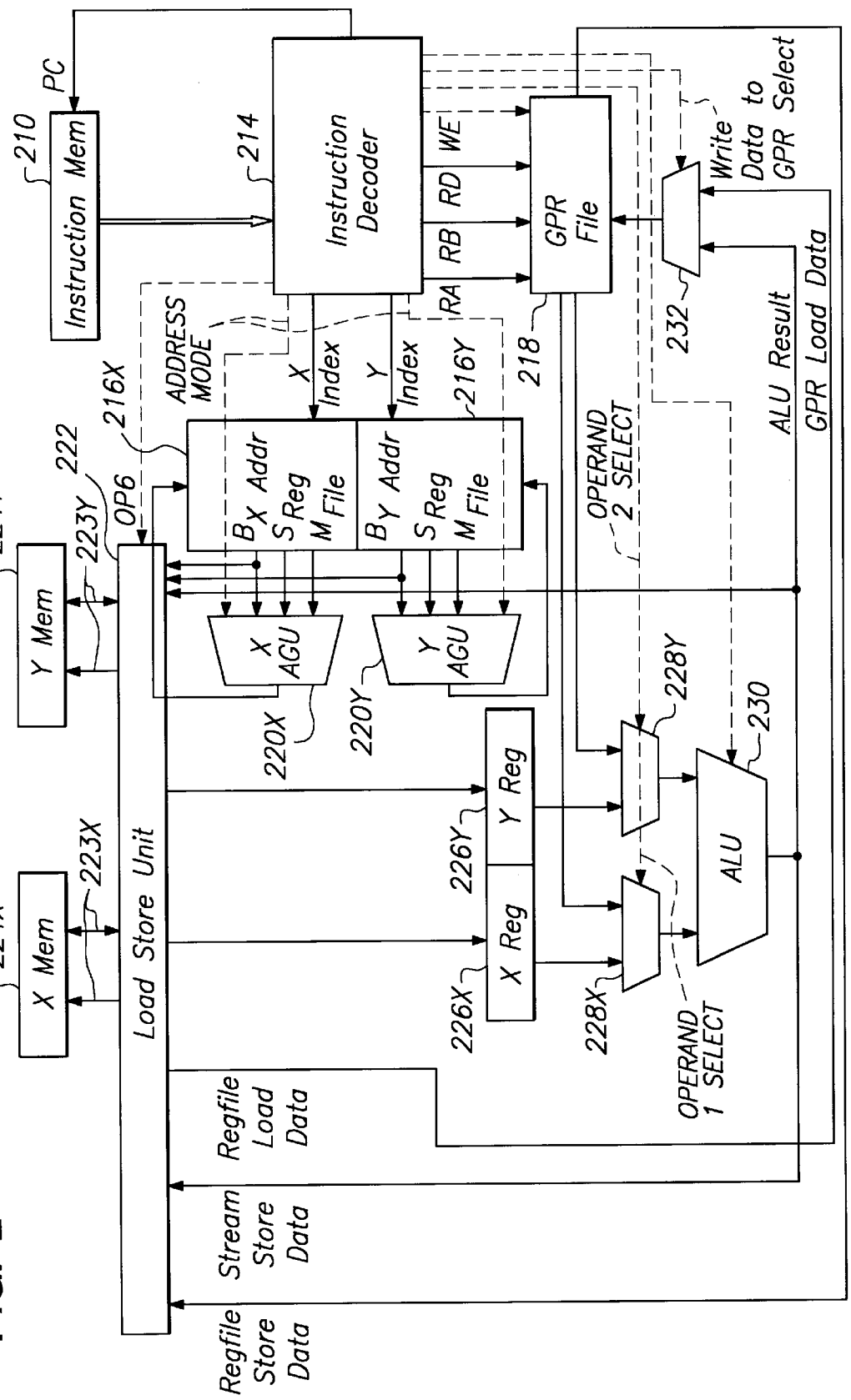
FIG. 2 is a high-level block diagram illustrating the functional components of a processor supporting data streaming.

FIG. 2 is high-level a block diagram illustrating certain functional components of a processor 200 constructed according to an embodiment of the present invention. Shown are an instruction memory 210, an instruction decoder 214, X and Y address register files 216, and a general purpose register (GPR) file 218. Also shown are X and Y address generation units (AGUs), a load/store unit 222, an X memory 224X, and a Y memory 224Y. In addition, FIG. 2 shows X and Y stream registers 226, X and Y multiplexers (MUXs) 228, an arithmetic logic unit (ALU) 230, and a GPR MUX 232.

The instruction memory 210 is coupled to the instruction decoder 214 and holds instructions for the program being executed by the processor 200. The instruction memory 210 receives a program counter from the instruction decoder 214 that identifies an instruction in the memory 210. The identified instruction is transmitted from the instruction memory 210 to the instruction decoder 214.

The instruction decoder 214 is coupled to the instruction memory 210, the X and Y address register files 216, and the GPR file 218. In addition, the instruction decoder 214 is coupled via control lines (shown as dashed lines in FIG. 2) to the X and Y address register files 216, the load/store unit 222, the X and Y MUXs 228, the ALU 230, and the GPR MUX 232. The instruction decoder decodes instructions received from the instruction memory 210 and controls the operation of the processor 200 in response thereto. For purposes of this discussion, assume that the received instruction is a streaming ALU instruction. As will be described in more detail below, the streaming ALU instruction specifies three operands: two sources and one destination. The source operands are selected from among the X and Y stream registers 226 and the GPR file 218. The destination operand is selected from either the X or Y memory 224 or the GPR file 218. While decoding the instruction, the instruction decoder 214 sends a first index from the first operand to the X address register file 216X, a second index from the second operand to the Y address register file 216Y, and all three operands to the GPR file 218. In addition, the instruction decoder 214 sends control signals to the AGUs 220 indicating address modes of the instruction and to the GPR file 218 indicating whether the GPR MUX 232 will write to the GPR file 218.

Figure 3:
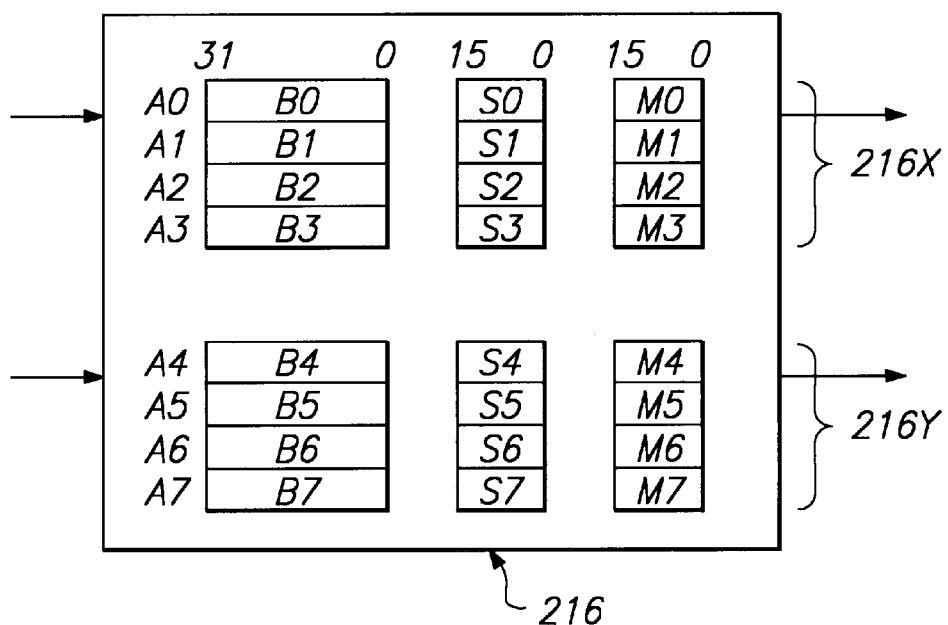
FIG. 3 is a high-level block diagram illustrating an address register file.

The X and Y address register files 216 respectively receive the X and Y indices from the instruction decoder 214. In addition, the X and Y address register files 216 are each coupled to respective AGUs 220 and to the load/store unit 222. FIG. 3 illustrates a more detailed view of the address register file 216. The address register file 216 has eight address register sets A0–A7 divided into two groups of four register sets each A0–A3, A4–A7. The first group of four register sets forms the X register file 216X while the second group of four register sets forms the Y register file 216Y. Each address register set, of which register set A0 is exemplary, has one 32-bit base register B0, one 16-bit step register S0, and one 16-bit modulo register M0. Since there are only four register sets in each group A0–A3, A4–A7, only a two-bit index is needed to select a particular register set in a group. The X and Y indices received from the instruction decoder 214 respectively select a register in the X and Y address register files 216. The contents of the selected X and Y address registers 216 are sent to the respective AGUs 220 and the contents of the selected X and Y base registers 216 are sent to the load/store unit 222.

The X and Y AGUs 220 respectively receive the contents of the X and Y address registers and the address mode control signals from the instruction decoder 214 and have an output coupled to the inputs of the X and Y address register files 216. In response to receiving address register contents, the AGUs 220 post-modify the selected base registers B0 according to the addressing mode and the step S0 and modulo M0 registers. Modes supported by the AGUs 220 include: 1) auto post decrement; 2) auto post increment; 3) step post decrement; 4) step post increment; 5) base (no modification); and 6) bit reversed. In modes one and two, the base register B0 is modified according to the contents of a user processor status register (not shown). In modes three and four, the base register B0 is either incremented or decremented according to the contents of the step register S0. In the post decrement/increment modes, modes one through four, the modulo value in the modulo register M0 qualifies the address calculation to give addressing for circular buffers. Since there are six address modes, three bits are needed to select a particular mode.

The respective X and Y address register files 216 also send the contents of the selected base registers to the load/store unit 222. The load/store unit 222 is coupled to the X and Y address register files 216, the X and Y stream registers 226, the ALU 230, the GPR MUX 232, and the GPR file 218 and receives control signals from the instruction decoder 214. In addition, the load/store unit 222 is bi-directionally coupled to the X and Y memories 224. The couplings 223 between the load/store unit 222 and the memories 224 each comprise separate address and data busses like those shown in FIG. 1 and, thus, form a modified Harvard architecture.

The load/store unit 222 loads data from and stores data to addressable memory locations within the processor 200, including the X and Y memories 224. For stream accesses, the load/store unit 222 loads data from the X and Y memories 224 to the X and Y stream registers 228, respectively. For normal accesses, the load/store unit 222 loads data from the memories to the GPR file 218 via the GPR MUX 232. If specified by a streaming instruction, the load/store unit 222 stores input data received from the ALU 230 in the X or Y memory 224. The load/store unit 222 also stores input data received from the GPR file 218 in memory in response to an explicit store instruction.

The X register file 216X can reference only addresses in X memory 216X while the Y register file 216Y can reference only addresses in Y memory 216Y. Thus, the load/store unit 222 does not need to determine to which memory 224 an address received from the address register file 216 applies. For non-stream accesses, the address received by the load/store unit 222 explicitly identifies the memory to which the address applies.

The X and Y 224 memories are coupled to the load/store unit 222 and are addressable memories. In response to receiving a memory address and control signals from the load/store unit 222, the memories either store an input at the referenced memory address or output the contents of the referenced memory address.

The X and Y stream registers 226 receive inputs from the load/store unit 222, output to the X and Y MUXs 228, and are at least 32 bits wide. The X and Y stream registers 226 store the data fetched by the load/store unit 222 from the X and Y memories 224, respectively, when streaming ALU 230 instructions are performed.

The GPR file 218 has inputs coupled to the instruction decoder 214 and the GPR MUX 232 and outputs coupled to the X and Y MUXs 228 and the load/store unit 222. There are 32 GPRs in the GPR file 218 and each GPR is at least 32 bits wide. The GPRs 218 hold general purpose data used by the processor 200. Accordingly, the contents of the GPRs within the file 218 can be loaded from and stored to memory via the load/store unit 222 in response to explicit load and store instructions.

When decoding a stream instruction, the instruction decoder 214 sends the three operand fields in the stream instruction to the GPR file 218. The first two operands specify the sources for the streaming ALU 230 operation. Since there are 32 GPRs in the file 218, five-bit indices in each of the first two operand fields specify particular GPRs in the GPR file 218. The contents of the GPR specified by the first operand are sent to the MUX 228X corresponding to the X register 226X and the contents of the GPR specified by the second operand are sent to the MUX 228Y corresponding to the Y register 226Y. The third operand, along with the operand selection field described below, specifies the destination of the result of the ALU 230 operation. If this destination is a GPR, then the GPR file 218 receives the result from the ALU 230 via the GPR MUX 232 and stores it in the GPR identified by the third operand.

The X and Y MUXs 228 respectively receive the contents of the X and Y stream registers 226 and the contents of the specified first and second GPRs. The outputs of the MUXs 228 are passed to the ALU 230. Each MUX receives control signals from the instruction decoder 214 specifying which input the MUX will output to the ALU 230.

The ALU 230 receives inputs from the MUXs 228, receives control signals from the instruction decoder 214, and has an output coupled to the load/store unit 222 and the GPR MUX 232. The ALU 230 performs an arithmetic operation on its inputs and produces an output. The type of operation performed is specified by the control signals received from the instruction decoder 214.

The GPR MUX 232 has an input coupled to the ALU 230 output and an input coupled to an output of the load/store unit 222, receives control signals from the instruction decoder 214, and has an output coupled to the GPR file 218. When so controlled by the instruction decoder 214, the GPR MUX 232 outputs a received input to the GPR file 218.

Figure 4:
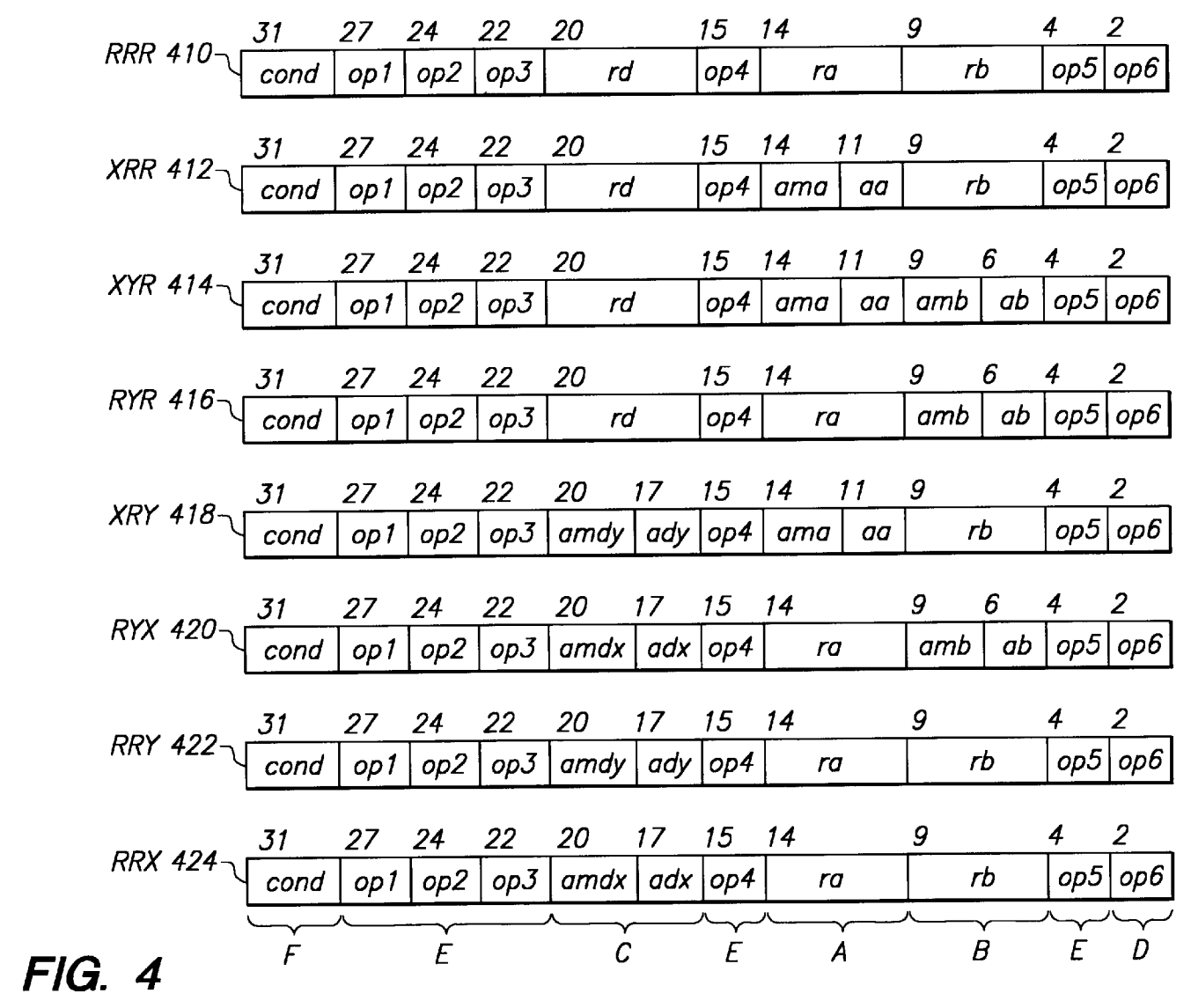

FIG. 4 illustrates instruction encoding for a streaming ALU instruction of the type decoded by the instruction decoder 214. As can be seen in FIG. 4, there are eight instruction encoding formats and each instruction encoding format is identified by a three letter code that specifies the operands for that format. The three letters respectively specify the source of the first operand, the source of the second operand, and the destination for the results of the ALU 230 operation. When in the first or second position, the letter "X" specifies the X stream register 226X, the letter "Y" specifies the Y stream register 226Y, and the letter "R" specifies a GPR. When in the third position, the specifies the X memory 224X, the letter "Y" specifies the Y memory 224Y, letter "R" specifies a GPR. For example, instruction format 414 is labeled indicating that the source operands respectively come from the X and Y stream 226 and the destination is a GPR.

The instruction format 400 is preferably 32 bits in length. Bits 14–10, labeled "A," identify the first operand, bits 9–5, labeled "B," identify the second operand, and bits 20–16 labeled "C," identify the third operand. Op6 bits 2–0, labeled as "D," specify the type of encoding (operands) used by the instruction format. Op1–5 bits 27–21, 15, and 4–3, labled as "E," contain operation codes (opcodes) for the instruction format. Finally, COND bits 31–28, labeled as "F," identify the conditions under which the instruction will execute.

Field D is a three-bit operand select field that specifies from where the first and second operands of the ALU are read and to where the result of the ALU 230 operation is stored (operand 3). Table 1 indicates the possible operand combinations, the corresponding value of field D (Op6), and the corresponding reference numeral in FIG. 4.

TABLE 1

| Numeral | Op6 | Operand 1 | Operand 2 | Operand 3 |
|---------|-----|-----------|-----------|-----------|
| 410 | 000 | GPR | GPR | GPR |
| 412 | 001 | X | Y | GPR |
| 414 | 010 | GPR | GPR | X Memory |
| 416 | 011 | GPR | GPR | Y Memory |
| 418 | 100 | X | GPR | GPR |
| 420 | 101 | GPR | Y | GPR |
| 422 | 110 | X | GPR | Y Memory |
| 424 | 111 | GPR | Y | X Memory |

The first operand is selected from either a GPR or the X stream register 226X. The second operand, in contrast, is selected from either a GPR or the Y stream register 226Y. The third operand can be stored in X memory 224X, Y memory 224Y, or a GPR.

Fields A, B, and C respectively specify the first, second, and third operands. The first A and second B operands are used to update the inputs to the ALU 230 (the stream registers 226 and the GPR file 218) for use by a subsequent ALU 230 operation. The values specified by the first and second operands overwrite the values previously held in the stream registers 226. As mentioned above, the third operand indicates where to store the result of the current ALU 230 operation.

Since there are 32 GPRs in the GPR file 218, each of the operand fields A,B,C is five bits wide. Since there are only four register sets in each of the X and Y address register files 216, and since the first operand A can only select register sets in the X register file 216X and the second operand B can only select register sets in the Y register file 216Y, only two bits of encoding within the first A and second B operand fields are needed to select a particular register set within the address register file 216. In addition, three bits of encoding are needed to select among the possible addressing modes. Table 2 lists the possible addressing modes and the associated address mode bits.

TABLE 2

| Value of Address Mode Bits | Address Mode |
|---|---|
| 000 | X and Y Stream Registers are Used by Themselves |
| 001 | Base |
| 010 | Auto Post Increment |
| 011 | Auto Post Decrement |
| 101 | Bit Reversed |
| 110 | Step Post Increment |
| 111 | Step Post Decrement |

In the operand fields A,B,C, the five bits used to select a GPR are overlapped with the two-bit subfield for the address register index and the three-bit subfield for the addressing mode. Thus, only a single five-bit field A,B,C is needed for each of the three operands. For example, instruction format 410 is for an RRR instruction and, accordingly, all three operand are illustrated as five-bit fields A,B,C. Instruction format 418, in contrast, is an RYX instruction and the five-bit fields for the second B and third C operands are shown as divided into three- and two-bit subfields.

When a program wants to use a GPR as one of the source operands, the programmer uses the five-bit operand field to specify the GPR. When the programmer wants to use the X stream register 226X as the first operand, the programmer puts the two-bit index for the register set and three bits specifying the addressing mode in the first operand field A. The programmer can use the Y stream register 226Y as the second operand in the same manner. If the address mode bits are set to 000, then the value in the X or Y stream register 226 is used without initiating a memory fetch or updating the address register 216.

The opfields E describe the computation to be performed by the processor. The COND field F describes conditions to be checked before the computation is performed.

Figure 5:
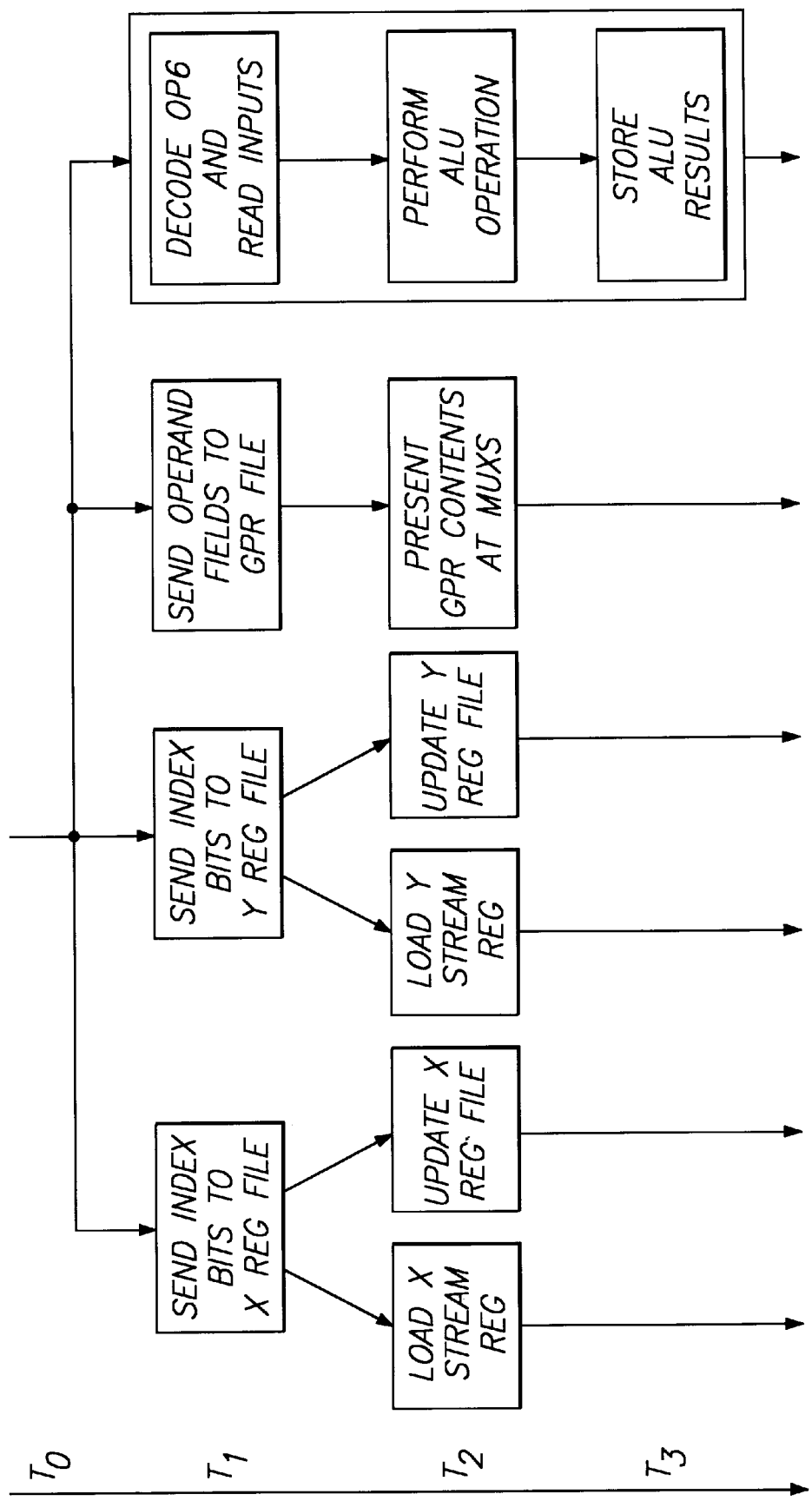
FIG. 5 is a timing chart illustrating the steps performed by the processor of FIG. 2 when executing a stream instruction.

FIG. 5 is a timing chart illustrating the steps performed by the processor 200 when executing a stream instruction like those illustrated in FIG. 4. In FIG. 5, time flows in the direction indicated by the arrow 500 on the left of the figure and the boxes to the right illustrate the order in which the indicated steps are performed by functional units of the processor 200. Since the functional units of the processor 200 operate in parallel, FIG. 5 should not be construed to indicate that time-aligned steps occur at the same time, but rather merely indicates the approximate sequence in which steps are performed.

First, a stream instruction like that illustrated in FIG. 4 is received by the instruction decoder 214 T0. Next T1, the instruction decoder 214 sends the index bits of the first and second operands to the X and Y address register files 216, respectively. At the same time T1, the instruction decoder 214 sends all three of the operands to the GPR file 218.

In addition, the instruction decoder decodes the Op6 field to determine the operands to the current ALU 230 operation and where the result should be stored. The following pseudocode explains the instruction decoding performed by the decoder 214 when decoding the Op6 field:

```
// select ALU inputs
if(Op6 == 001) or (Op6 == 100) or (Op6 == 110) then
    MUX 228X selects Register 226X
else
    MUX 228X selects GPR(first operand)
if(Op6 == 001) or(Op6 == 101) or (Op6 == 111) then
    MUX 228Y selects Register 226Y
else
    MUX 228Y selects GPR(second operand).
```

Once the Op6 field is decoded, the ALU 230 reads the selected inputs from the instruction decoder 214.

Next T2, the address register files 216 pass the contents of the selected registers to the load/store unit 222 and cause the appropriate values to be loaded into the X and Y stream registers 226. Also, the AGUs 220 update the address registers selected by the index bits. At the same time, the ALU 230 operation indicated by the decoded instruction is performed on the previously read operands.

Next, the result of the completed ALU 230 operation is stored in the location indicated by the Op6 field and the third operand as indicated by the following pseudocode:

```
// store ALU output
if(Op6 == 010) or (Op6 == 111) then
    load/store unit 222 sends ALU 230 output to X Memory 224X
else if(Op6 == 011) or (Op6 == 110) then
    load/store unit 222 sends ALU 230 output to Y Memory 224Y
else
    (GPR(third operand) <= ALU 230 output.
```

Thus, a stream operation does three tasks in parallel:
1) carries out the specified ALU 230 operation on the operands in the X and Y stream registers 226 or the GPR file 218 and stores the result;
2) updates the operands to the ALU 230 by updating the data in the X and Y stream registers 226 and presenting the contents of two GPRs from the GPR file to the X and Y MUXs 228; and 3) calculates the addresses for the next two memory references using the AGUs 220 and stores the addresses in the address register file.

Consider, for example, a streaming implementation of the "add" instruction using the format "add source1 source2 result." A streaming add instruction using the X stream register 226X and Y stream register 226Y as the source operands, storing the result of the add in a GPR in the GPR file 218, and post-incrementing the source operands is denoted as "add [x++] [y++] GPR," where "x" and "y" respectively refer to registers within the X and Y address register file 216 and "GPR" refers to a register within the GPR file 218. This add instruction corresponds to instruction format 414.

When this instruction is executed by the processor 200, the data in the X streaming register 228X are added to the data in the Y streaming register 228Y by the ALU 230. The result of this add operation is stored in the identified GPR. In addition, a fetch is initiated from X memory 224X for the data addressed by [x] and is stored in the X streaming register 226X. Likewise, a fetch is initiated from Y memory 224Y for the data addressed by [y] and is stored in the Y streaming register 226Y. Finally, the base registers of the [x] and [y] registers within the address register file 216 are updated. If the streaming add instruction had been denoted as "add X [y++] GPR," then the memory fetch from X memory 224X and the update of the [x] register would not have been performed because the contents of the X stream register 226 would have been reused.

In another example, consider the instruction denoted "add [x++] GPR [y++]." When the processor 200 executes this instruction, the data in the X stream register 226X are added to the data in the identified GPR and the result of the add operation is stored in the location within Y memory 224Y identified by [y]. Also, a fetch is initiated from X memory 224X for the data identified by [x]. The fetched data is stored in the X streaming register 226X. Finally, the base registers of the [x] and [y] registers within the address register file are updated.

What is claimed is:

1. A method of executing an instruction having first, second, and third and an operand specifier, wherein the instruction specifies a logic operation, the method comprising the steps of:

performing the specified logic operation on first and second values selected from among first and second registers, respectively, and a general purpose register file to produce a result, wherein the operand specifier specifies from where to select the first and second values;

storing the result of the logic operation in a location selected from among first and second memories and the general purpose register file as identified by the third operand and the operand specifier;

updating the first value in the first register according to the first operand, the updating occurring substantially concurrently with the performance of the specified logic operation; and updating the second value in the second register according to the second operand, the updating occuring substantially concurrently with the performance of the specified logic operation.

2. The method of claim 1, wherein the step of updating the first value in the first register comprises the substeps of:

providing a first index in the first operand to an address register file; and selecting a first address register in the address register file holding an address with the first index.

3. The method of claim 2, further comprising the steps of:

retrieving the first value specified by the address from an addressable memory; and updating the address in accordance with an addressing mode specified by the first operand.

4. The method of claim 3, further comprising the step of storing the retrieved first value in the first register.

5. The method of claim 1, wherein the storing location of the result of the logic operation identified by the third operand and the operand specifier comprises a register in the general purpose register file.

6. The method of claim 1, wherein the storing location of the result of the logic operation identified by the third operand and the operand specifier comprises an addressable memory.

7. The method of claim 1, wherein the logic operation is an arithmetic logic operation.

8. The method of claim 1, wherein the first and second operands respectively specify first and second addressing modes and the updating steps respectively update the first and second values in the first and second registers according to the first and second addressing modes.

9. The method of claim 1, wherein the first and second registers comprise stream registers.

10. A media processor for executing an instruction specifying first, second, and third operands and an operand combination, the processor comprising:

first and second memories for holding data for use by the media processor;

first and second stream registers, respectively coupled to the first and second memories, for holding data addressed in the first and second memories;

an address register file having first and second groups of register sets, wherein registers in the first and second groups of register sets are adopted to respectively specify addresses in the first and second memories and addressing modes;

a general purpose register file having a plurality of general purpose registers for holding general purpose data; and a logic unit accepting first and second inputs selected from among the first and second stream registers, respectively, and the general purpose registers, and producing an output stored at a location selected from the general purpose register file and the first and second memories;

wherein the first and second inputs to the logic unit are selected by the operand combination and the output of the logic unit is stored at a location specified by the third operand and the opened combination;

wherein the first and second operands of the instruction respectively specify first and second register sets in the address register file; and wherein the first and second operands of the instruction respectively specify first and second general purpose registers in the general purpose register file.

11. The processor of claim 10, wherein each register set in the address register file comprises:

a base register;

a step register; and a modulo register;

wherein the step and modulo registers are used to modify the base register according to the specified addressing mode.

12. The processor of claim 11, further comprising:

an address generation unit for modifying the base register according to the specified addressing mode, the step register, and the modulo register.

13. The processor of claim 10, further comprising:

a load/store unit disposed between the first and second memories and the first and second stream registers, wherein the load/store unit transfers the first and second values from the first and second memories to the first and second stream registers.

14. A processor for processing an instruction, the processor having an address register file, a general purpose register file in communication with first and second memories, and a logic operation unit accepting first and second inputs, wherein the instruction comprises:

an operation field specifying a logic operation to perform on the first and second inputs to the logic operation unit;

a first field specifying a first operand, wherein the first operand is selected from between the address register file and the general purpose register file and is capable of updating the first input to the operation unit;

a second field specifying a second operand, wherein the second operand is selected from between the address register file and the general purpose register file and is capable of updating the second input to the logic operation unit; and a third field specifying a third operand indicating where to store a result of the logic operation, wherein the third operand is selected from among the general purpose register file and the first and second memories.

15. The processor of claim 14, wherein the address register file is comprised of first and second address register sets and wherein the first field specifies a first register in the first address register set and the second field specifies a second register in the second address register set.

16. The processor of claim 14, wherein the first and second fields each comprise a plurality of bits and wherein selecting a particular general purpose register in the general purpose register file uses the same bits as selecting an address register in the address register file and an addressing mode.

17. The processor of claim 14, further comprising:

a fourth field specifying the selection of the first, second, and third operands;

wherein the first and second fields respectively specify first and second addressing modes when the fourth field specifies the first and second operands are selected from the address register file.

18. The processor of claim 17, wherein the specification in the first and second fields of the address register file and addressing mode is overlapped with the specification of the general purpose register file.

* * * * *

UNITED STATES PATENT AND TRADEMARK OFFICE
CERTIFICATE OF CORRECTION

PATENT NO.  : 5,958,038

DATED       : September 28, 1999

INVENTOR(S) : Nitin Agrawal and Sunil Nanda

It is certified that error appears in the above-identified patent and that said Letters Patent is hereby corrected as shown below:

Column 9, line 42, insert the word --operands-- after the word "third".

Signed and Sealed this

Third Day of April, 2001

Attest:

NICHOLAS P. GODICI

*Attesting Officer*  *Acting Director of the United States Patent and Trademark Office*